United States Patent [19]

Cornelius

[11] 3,734,624
[45] May 22, 1973

[54] APPARATUS USING REFLECTED POLARIZED LIGHT TO INSPECT A MOVING WEB

[75] Inventor: Edward C. Cornelius, Fairport, N.Y.

[73] Assignee: Eastman Kodak Company, Rochester, N.Y.

[22] Filed: May 6, 1971

[21] Appl. No.: 140,932

[52] U.S. Cl. .................................356/118, 356/200
[51] Int. Cl. .............................................G03b 27/04
[58] Field of Search.......................356/209, 211, 118, 356/114, 116, 200, 237

[56] References Cited

UNITED STATES PATENTS 3,125,265   3/1964   Warren et al...........................356/200
3,515,488   6/1970   Houser...................................356/200
3,612,692   10/1971  Druppe..................................356/114

Primary Examiner—Edward S. Bauer
Attorney—W. T. French, R. F. Crocker and Robert F. Cody

[57] ABSTRACT

In an inspection system for detecting defects in the photosensitive surface of photographic material, laser means grazes visible light off the photosensitive surfaces of photographic material. The light is swept rapidly across the surface of the photosensitive material; and such light is polarized so that its plane of polarization is perpendicular to its plane of incidence. The special polarization, together with the rapid sweeping of the light across the photosensitive surface, prevents the photosensitive surface from producing latent images.

6 Claims, 3 Drawing Figures

PATENTED MAY 22 1973

3,734,624

EDWARD C. CORNELIUS
INVENTOR.

BY *Robert F. Cody*

ATTORNEY

APPARATUS USING REFLECTED POLARIZED LIGHT TO INSPECT A MOVING WEB

BACKGROUND OF THE INVENTION

1. Field of the Invention

This invention relates to the inspection of photographic materials; and in particular to the inspection of the surfaces of photographic webs.

2. Description Relative to the Prior Art

The detection of surface defects in the emulsion coat on a photographic web, by grazing a beam of infrared radiation off the surface of the web, is well known. See U.S. Pat. No. 3,125,265. A frequent problem with such technique, however, is that part of the beam may penetrate the emulsion and be reflected off the base support for the emulsion, thereby sometimes providing an ambiguity to which a photopickup, responsive to the reflected infrared radiation, would undesirably respond.

It has been demonstrated that, by use of reciprocity law failure, visible light may be employed to inspect unexposed photographic emulsions. See U.S. Pat. No. 3,556,664. Use of visible light, as opposed to the prior art use of infrared radiation, in a reflection inspection system, would have several advantages, least of which is that visible light can be seen, and alignment of the inspection apparatus would, therefore, be greatly simplified. Also, photopickups that are responsive to visible light have signal-to-noise qualities which are several orders better than those which are responsive to infrared radiation; and shorter wavelength (i.e., visible) light is inherently more easily defined into a very small spot for purposes of detecting and resolving extremely small surface defects.

SUMMARY OF THE INVENTION

1. The invention proposes, for use in a reflection scanner for detecting surface defects in a photographic web, that the light which is used be polarized, and be so beamed at a grazing angle with respect to the web that the plane of polarization of such light is perpendicular to the plane of incidence for the light. Such a practice prevents the beamed radiation from penetrating through the emulsion (the surface of which is to be examined) for reflection off, and absorption by, the base support for the emulsion.

2. The invention further proposes that the polarized light which is beamed as described above, preferably, be visible light.

The advantages to be gained by item (1) above are: The light intensity level which is employed for reflection scanning of a photosensitive material may either be reduced or, if retained without modification, the signal-to-noise ratio seen by the photopickup of the system will be greatly increased; in one embodiment of the invention, the signal-to-noise ratio was increased by a factor of about 20 times. Also, since substantially none of the beamed light is reflected from the base support for the emulsion, the problem of ambiguity is, attendantly, avoided.

The advantage to be gained from item (2) above, aside from those indicated above in connection with the Description Relative to the Prior Art, is that assurance can be provided that reciprocity law failure, as desired, will obtain for reflection scanning of photographic webs according to the teachings of U.S. Pat. No. 3,556,664: That is, since practically none of the beamed polarized visible light penetrates the coated emulsion, concern for assuring reciprocity law failure in connection with the scanning beam is greatly minimized.

The advantages which are gained by practicing the invention are directly related to the specularity of the photographic film being inspected.

An object of the invention is to increase the efficiency of a reflection scanner for detecting surface defects in the emulsion coated on a photographic web.

Another object of the invention is to increase the reliability of a reflection scanner for detecting surface defects in the emulsion coated on a photographic web.

Another object of the invention is to facilitate the use of visible light in a reflection scanner for detecting surface defects in the emulsion coated on a photographic web, whereby easy system alignment, smaller spot size, and unambiguous signal detection will obtain.

The invention will be described with reference to the Figures, wherein.

Figure 1:
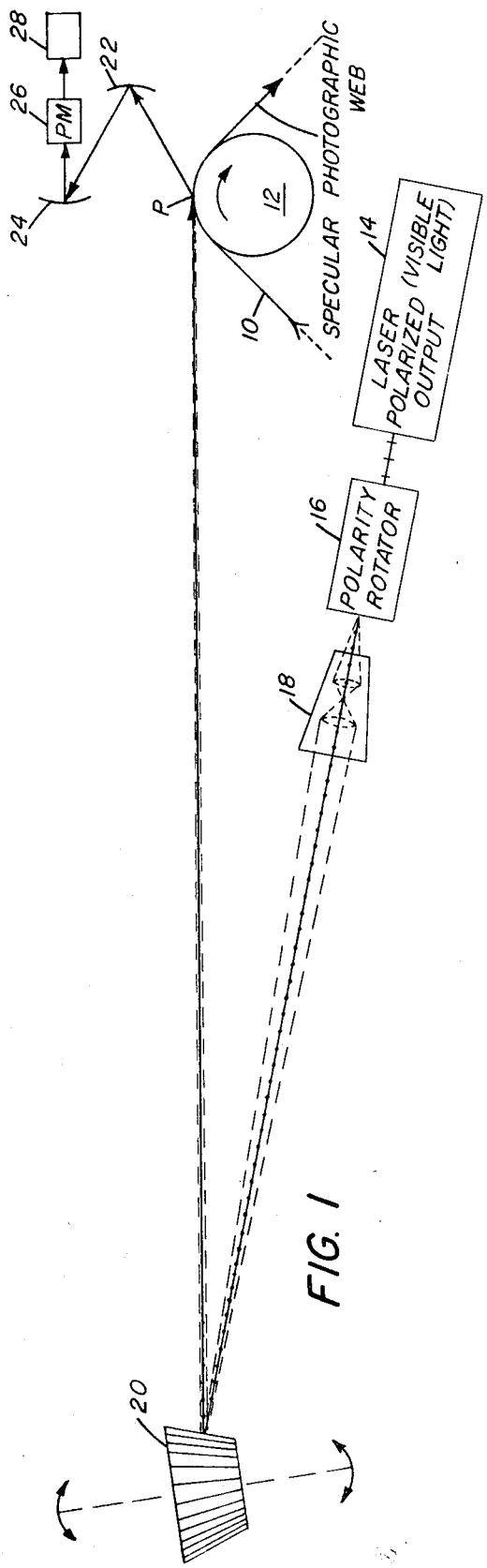
FIG. 1 is a schematic diagram illustrating an embodiment of the invention.

Reference should now be had to FIG. 1, which shows a specular photographic web 10 being passed over a roller 12. A laser 14, having a coherent polarized visible output, directs its output radiation via a polarity rotator 16 to focusing optics 18; and thence via a rotary multifaceted mirror 20 (which, according to the teaching of U.S. Pat. No. 3,556,664, rapidly sweeps such radiation widthwise across the web 10) to an inspection point(s) P on the web. Lasers for producing coherent polarized visible light are now well known; and polarity rotators are also well known (e.g., the Model 310 Polarization Rotator — employing a half-wave retardation plate — manufactured by Spectra-Physics, 1250 West Middlefield Road, Mountain View, Calif. 94040).

The focused light which impinges upon point P of the web 10 is adapted to graze off the web to a collecting mirror 22; and thence be focused by a mirror 24 to a photopickup 26 that is responsive to radiation produced by the laser 14. The photopickup 26 is cooperative with a using circuit or device 28 that registers changes (i.e., surface defects) in the output of the photopickup 26.

For sake of explanation, the laser 14 of FIG. 1, according to accepted notation for indicating planes of polarization, is shown providing polarized visible light having a plane of polarization that is in the plane of incidence for light beamed at point P of the web 10. After passing through the polarity rotator 16, however, the plane of polarization for the laser light is rotated 90° so as to be perpendicular to the plane of incidence for the light beamed at web point P.

Figure 2:
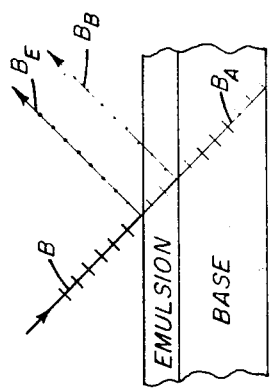

FIG. 2 indicates the effect of beaming, at a photographic element, light that is (largely) polarized in the plane of incidence. To be noted is that part $B_E$ of the original beam B is reflected off the surface of the emulsion, as desired; another part $B_B$ of the original beam B is reflected off the base support for the emulsion; and part $B_A$ is transmitted through and/or absorbed by the base support. The part $B_A$ of the radiation not received by the photographic element is completely wasted; and, worse than that, the part $B_B$ of the radiation, which is reflected from the face of the support base, creates the aforementioned ambiguity, since such radiation $B_B$ may trigger the photopickup 26 wrongly to indicate a surface defect in the emulsion.

Figure 3:
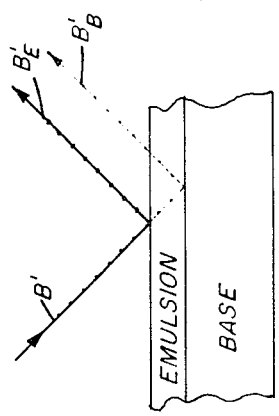
FIGS. 2 and 3 are diagrams useful for explaining the advantages gained by means of the invention.

Reference should now be had to FIG. 3 which depicts the polarized radiation that is beamed at a photographic element as being polarized perpendicularly to the plane of incidence. So long as the incident radiation B' sees a smooth specular surface, the radiation B' is almost fully reflected $B'_E$ from the emulsion coat, with only a very small amount $B'_B$ ever reaching and being reflected off the support base. Thus, energy is not wasted; and ambiguous signal outputs cannot be produced by the base support.

Since very little light ($B'_B$) in FIG. 3 ever enters the emulsion, use of polarized visible light for the beam B' is facilitated because reciprocity law failure will, in accordance with the teaching of U.S. Pat. No. 3,556,664, more assuredly obtain. And, as noted above, use of visible light in a reflection inspection system for photosensitive material means that system setup and alignment are more easily implemented; that a more sensitive visible light photopickup 26 may be employed instead of a relatively hard-to-use infrared photopickup; and that the size of the spot which is used to locate defects in the surface of the emulsion may be made extremely small for defect-resolution purposes.

[Consistent with the above-mentioned requirements for the reflection inspection of photographic material by polarized light that has a plane of polarity perpendicular to its plane of incidence, for easy penetration of a photographic web during transmission inspection thereof, as described in U.S. Pat. No. 3,556,664, the invention suggests that light having a polarization plane that is parallel to the incident plane be employed.]

The invention has been described in detail with particular reference to preferred embodiments thereof, but it will be understood that variations and modifications can be effected within the spirit and scope of the invention. For example, it would be within the scope of the invention to arrange the laser 14 (without a polarity rotator) so that the plane of polarization for its output energy is perpendicular to the indicated plane of incidence.

What is claimed is:

1. In a system for inspecting the specular surface of photosensitive material by means of radiation reflected off said surface, comprising:
   a. means for providing and beaming electromagnetic radiation at a grazing angle with respect to the surface of said photosensitive material, and
   b. signal producing photopickup means for receiving radiation that grazes off the surface of said photosensitive material, the improvement wherein said means for providing and beaming electromagnetic radiation is adapted to produce polarized electromagnetic radiation, and is so disposed to beam said polarized electromagnetic radiation that the plane of polarization for said electromagnetic radiation is perpendicular to the plane of incidence for said radiation as it grazes the surface of said photosensitive material.

2. The invention of claim 1 wherein said means for providing and beaming electromagnetic radiation is laser means.

3. The invention of claim 2 wherein said laser means comprises:
   a. a laser of the type that produces polarized light, and
   b. a polarity rotator for receiving the laser light output and rotating the plane of polarity of said light output so that it is perpendicular to the plane of incidence for said radiation as it grazes the surface of said photosensitive material.

4. The invention of claim 1
   a. wherein said means for providing electromagnetic radiation is adapted to provide visible light,
   b. wherein the photopickup is responsive principally to visible light, and
   c. wherein said system includes means for sweeping said visible light across the surface of said photosensitive material at a rate which is sufficient to prevent latent images from being formed in said photosensitive material.

5. The invention of claim 4 wherein said means for providing and beaming visible light is laser means.

6. The invention of claim 5 wherein said laser means comprises:
   a. a laser of the type that produces polarized visible light, and
   b. a polarity rotator for receiving the visible light output of said laser and rotating the plane of polarity of said visible light output so that it is perpendicular to the plane of incidence for said light as it grazes the surface of said photosensitive material.

* * * * *